(12) United States Patent
Suekuni

(10) Patent No.: US 7,453,243 B2
(45) Date of Patent: Nov. 18, 2008

(54) SWITCHING POWER SUPPLY WITH MULTIPLE OUTPUT VOLTAGES AND AN INTERMITTENT OSCILLATION PULSE IN STANDBY

(75) Inventor: Masato Suekuni, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 256 days.

(21) Appl. No.: 11/267,925

(22) Filed: Nov. 4, 2005

(65) Prior Publication Data
US 2006/0114699 A1 Jun. 1, 2006

(30) Foreign Application Priority Data
Nov. 4, 2004 (JP) .................... P2004-321062

(51) Int. Cl.
G05F 1/577 (2006.01)
H02M 3/335 (2006.01)
(52) U.S. Cl. .............. 323/267; 363/21.07; 323/902
(58) Field of Classification Search ............ 363/21.07, 363/21.01, 21.15, 65; 323/902, 267
See application file for complete search history.

(56) References Cited

U.S. PATENT DOCUMENTS

| | | | | |
|---|---|---|---|---|
| 5,535,082 A | * | 7/1996 | Botti et al. | 361/18 |
| 5,920,466 A | * | 7/1999 | Hirahara | 363/21.02 |
| 5,999,421 A | * | 12/1999 | Liu | 363/21.15 |
| 6,236,577 B1 | * | 5/2001 | Bando | 363/19 |
| 6,538,419 B1 | * | 3/2003 | Allen et al. | 323/285 |

FOREIGN PATENT DOCUMENTS

| | | |
|---|---|---|
| JP | 60-016178 | 1/1985 |
| JP | 11-332229 | 11/1999 |
| JP | 2000-287444 | 10/2000 |
| JP | 2000-324839 | 11/2000 |
| JP | 3094731 | 4/2003 |
| JP | 2004-32909 | 1/2004 |

OTHER PUBLICATIONS

Japanese Office Action for Japanese Application No. 2004-321062, mailed on Feb. 23, 2007, with English translation thereof (5 pages).

* cited by examiner

Primary Examiner—Jeffrey L. Sterrett
Assistant Examiner—Harry Behm
(74) Attorney, Agent, or Firm—Osha • Liang LLP

(57) ABSTRACT

If an intermittent oscillation pulse in a case in which the power consumption in the standby state is reduced at the maximum is supplied to a connection point from an output port of a microcomputer through a capacitor and a resistor, a DC component of the intermittent oscillation pulse is removed and is then supplied to the connection point. At this time, even when a voltage of the connection point becomes larger than a power supply voltage of the microcomputer, since a current does not flow backward from the connection point to the microcomputer, the microcomputer is normally operated. As such, the microcomputer is normally operated, so that the intermittent oscillation pulse is effectively supplied to the connection point. Thereby, a transistor is intermittently operated, the oscillation circuit intermittently performs oscillation operation, and the power consumption in the standby state is reduced.

3 Claims, 8 Drawing Sheets

FIG. 7

| CYCLE \ DUTY RATIO | 1/5 | 1/6 | 1/7 | 1/8 | 1/9 |
|---|---|---|---|---|---|
| 180 [μs] | ○ | ○ | ▨ | ▨ | ▨ |
| 195 [μs] | ○ | ○ | ○ | ▨ | ▨ |
| 210 [μs] | ○ | ○ | ○ | ▨ | ▨ |
| 225 [μs] | ○ | ○ | ○ | ○ | ▨ |
| 240 [μs] | ○ | ○ | ○ | ○ | ▨ |
| 255 [μs] | ○ | ○ | ○ | ○ | ○ |
| 270 [μs] | ○ | ○ | ○ | ○ | ○ |
| 285 [μs] | ○ | ○ | ○ | ○ | ○ |
| 300 [μs] | ○ | ○ | ○ | ○ | ○ |
| 315 [μs] | ○ | ○ | ○ | ○ | ○ |
| 330 [μs] | ○ | ○ | ○ | ○ | ○ |
| 345 [μs] | ○ | ○ | ○ | ○ | ○ |
| 360 [μs] | ○ | ○ | ○ | ○ | ○ |

SWITCHING POWER SUPPLY WITH MULTIPLE OUTPUT VOLTAGES AND AN INTERMITTENT OSCILLATION PULSE IN STANDBY

BACKGROUND OF THE INVENTION

1. Field of the Invention

The present invention relates to a switching power supply device in which a predetermined power supply voltage is generated at a secondary coil of a transformer by switching a current flowing through a primary coil of the transformer. More specifically, the present invention relates to a switching power supply device that is used as a power supply for optical disk devices such as a DVD recorder, a DVD player, or the like.

2. Description of the Related Art

Switching power supply devices have been used as power supplies for optical disk devices, such as DVD recorders, DVD players or the like. Generally, a switching power supply device according to the related art includes a transformer in which an induced voltage is output at a secondary coil through switching operation of a current flowing by a primary coil, an oscillation circuit that generates an oscillation signal for switching the current flowing through the primary coil of the transformer, an oscillation control circuit that controls the oscillation signal of the oscillation circuit on a basis of the voltage induced to the secondary coil of the transformer such that a DC voltage become have a predetermined value, a 12-volt generating circuit that generates a DC power supply voltage of a 12 V by the output voltage of the secondary coil of the transformer, a 5-volt generating circuit that generates a power supply voltage of 5 V by the output voltage of the secondary coil of the transformer, and a power supply feedback circuit that supplies an error signal to the oscillation control circuit as a feedback signal by comparing a reference voltage of 5 V generated on a basis of the power supply voltage of 5 V with the power supply voltage of 5 V and detecting a variation of the power supply voltage of 5 V as the error signal.

In addition, in another switching power supply device according to the related art, two transformers are used, and one of the two transformers is used for normal operation and the other is used for standby operation, so that the reduction of the power consumption in the standby state has been tried. However, since the two transformers are used, the power loss of the transformers is large, so that it is difficult to suppress the power consumption in the standby state to become a value equal to or smaller than 1 W.

FIG. 8 is a circuit diagram of a power supply feedback circuit included in a switching power supply device according to the related art. The power supply feedback circuit includes resistors R1 to R7 and R9, a capacitor C1, a transistor T1, a zener diode D1, and a photocoupler P. One end of the resistor R1 is supplied with a power supply voltage of 12V, and the other end of the resistor R1 is connected to a cathode of the zener diode D1 and one end of the resistor R2. An anode of the zener diode D1 is connected to a ground, and the other end of the resistor R2 is connected to one end of the resistor R3. The other end of the resistor R3 is connected to one end of the resistor R4 and one end of the resistor R5.

The other end of the resistor R4 is connected to a ground, and the other end of the resistor R5 is connected to one end of the resistor R6 and one end of the resistor R7. The other end of the resistor R6 is connected to one end of the capacitor C1, and the other end of the resistor R7 is connected to a base of the transistor T1. The other end of the capacitor C1 is connected to an emitter of the transistor T1 that is supplied with a power supply voltage of 5V. A collector of the transistor T1 is connected to an anode of a light-emitting diode D2 included in the photocoupler P through the resistor R9. The cathode of the light-emitting diode D2 is connected to a ground. The collector and the emitter of the phototransistor T2 included in the photocoupler P are connected to the above-mentioned oscillation control circuit.

A voltage of a connection point B between a reference voltage line and a control line is set to have a predetermined voltage of 5 V through the operation of the resistors R1 to R4 and the zener diode D1. The reference voltage line includes a connection point between the resistors R3 and R4, and the control line includes a base line of the transistor T1 which serves as an error detection element to detect an error signal generated when the power supply voltage of 5 V varies. The resistor R6 and the capacitor C1 serve to compensate for a phase at the time when the transistor T1 is operated.

Here, if the power supply voltage of 5 V supplied with the emitter of the transistor T1 increases to exceed the voltage of 5V, a collector current of the transistor T1 increases, so that the increased collector current is input to the photocoupler P through the resistor R9. Thereby, in the light-emitting diode D2 of the photocoupler P, a current increases, so that an amount of emitted light increases. As a result, in the phototransistor T2 which receives the increased amount of emitted light, an equivalent resistance is reduced. Accordingly, the oscillation control circuit, which will be described in detail below, controls an oscillation signal of the oscillation circuit and controls the power supply voltage having exceeded the voltage of 5 V so as to return to the original voltage of 5 V.

In contrast, if the power supply voltage of 5 V decreases to become smaller than the voltage of 5 V, the collector current of the transistor T1 decreases, so that the decreased collector current is input to the photocoupler P through the resistor R9. Thereby, in the light-emitting diode D2 of the photocoupler P, the current decreases, so that the amount of emitted light decreases. As a result, in the phototransistor T2 which receives the decreased amount of emitted light, the equivalent resistance is increased. Accordingly, the above-mentioned oscillation control circuit controls an oscillation signal of the oscillation circuit and controls the power supply voltage having become smaller than the voltage of 5 V so as to return to the original voltage of 5 V. As such, the power supply feedback circuit 9 performs feedback operation so as to maintain the power supply voltage of 5 V output from the above-mentioned 5-volt generating circuit as the predetermined voltage of 5 V.

However, in an optical disk device on which the switching power supply device according to the related art is mounted, in order to reduce the power consumption in a standby state, a power supply is cut off for a tuner or a fluorescent display tube in the standby state. However, it was difficult to maintain the power consumption in the standby state as a value equal to or smaller than 1 W. Accordingly, using a microcomputer included in the optical disk device, an intermittent oscillation pulse is generated from the microcomputer and is then supplied to a connection point B of a power supply feedback circuit shown in FIG. 8. In addition, the transistor T1 is switched, and the low power consumption is achieved. However, since the microcomputer is operated with a power supply voltage of 3.3 V smaller than the power supply voltage of 5 V, a current flows backward from the connection point B to the microcomputer, so that the microcomputer cannot be normally operated.

According to the related art disclosed in JP-A-2000-287444, in a switching power supply circuit which performs switching operation intermittently in a standby state, an intermittent frequency can be switched, and a stable power supply voltage corresponding to a secondary load of a transformer can be supplied. However, as described above, it is not possible to reduce the power consumption in the standby state using an intermittent oscillation clock output from a microcomputer operated with a voltage lower than a voltage of a main power supply output from the switching power supply device.

According to the related art disclosed in JP-A-60-16178, when a power supply is supplied to a load necessitating a low power, a switching element is turned on or turned off by an intermittent oscillation system, so that a power in accordance with an amount of a power of a power supply to be supplied is supplied. However, even in this technology, it is not possible to reduce the power consumption in the standby state using an intermittent oscillation clock output from a microcomputer operated with a voltage lower than a voltage of a main power supply output from the switching power supply device.

SUMMARY OF THE INVENTION

Accordingly, the invention has been made to solve the above-mentioned problems, and it is an object of the invention to provide a switching power supply device capable of reducing the power consumption in a standby state using an intermittent oscillation clock output from a microcomputer operated with a voltage lower than a voltage of a main power supply.

In order to achieve the above-mentioned object, a first aspect of an invention provides a switching power supply device including: an oscillation circuit that generates an oscillation signal to switch a current flowing through a primary coil of a transformer; an oscillation control circuit that controls the oscillation signal of the oscillation circuit on a basis of a voltage induced to a secondary coil of the transformer such that a DC voltage becomes a predetermined value; a first power supply voltage generating circuit that generates a first DC power supply voltage by an output voltage of the secondary coil of the transformer; a second power supply voltage generating circuit that generates a second DC power supply voltage lower than the first DC power supply voltage by the output voltage of the secondary coil of the transformer; and a power supply feedback circuit that supplies an error signal to the oscillation control circuit as a feedback signal by comparing a reference voltage generated on a basis of the first DC power supply voltage with the second DC power supply voltage and detecting a variation of the second power supply voltage as the error signal. In addition, an intermittent oscillation pulse output from a microcomputer is supplied to a connection point between a reference voltage line in the power supply feedback circuit and a control line of an error detecting element for detecting the error signal through a series circuit including a capacitor and a resistor. A duty ratio and a frequency of the intermittent oscillation pulse are varied, and an intermittent oscillation pulse in a case in which the power consumption in a standby state is reduced at the maximum is set to the microcomputer, and the set intermittent oscillation pulse is supplied to the connection point through the series circuit including the capacitor and the resistor in the standby state.

In this structure, the duty ratio and the frequency of the intermittent oscillation pulse are varied, and the intermittent oscillation pulse in a case in which the power consumption in the standby state is reduced at the maximum is set to the microcomputer, and the set intermittent oscillation pulse is supplied to the connection point through the series circuit including the capacitor and the resistor in the standby state. In this case, a DC component of the intermittent oscillation pulse is removed through the series circuit including the capacitor and the resistor and is then supplied to the connection point. At this time, even when the voltage of the connection point becomes larger than a power supply voltage of the microcomputer, since a current does not flow backward from the connection point to the microcomputer, the microcomputer is normally operated. The microcomputer is normally operated, so that the intermittent oscillation pulse is effectively supplied to the connection point. Thereby, the error detecting element of the power supply feedback circuit is intermittently operated, so that the oscillation circuit is intermittently oscillated and thus the transformer is intermittently operated. As a result, the power consumption in the standby state is reduced.

According to this structure, even when the microcomputer is operated with the voltage lower than the second power supply voltage, the most suitable intermittent oscillation clock output from the microcomputer is supplied to the connection point between the reference voltage line in the power supply feedback circuit and the control line of the error detecting element to detect the error signal, so that the power consumption in the standby state can be effectively reduced. Thereby, it is possible to suppress the power consumption in the standby state to become equal to or smaller than 1 W with a structure requiring a low cost.

A second aspect of the invention provides a switching power supply device including: an oscillation circuit that generates an oscillation signal to switch a current flowing through a primary coil of a transformer; an oscillation control circuit that controls the oscillation signal of the oscillation circuit on a basis of a voltage induced to a secondary coil of the transformer such that a DC voltage becomes a predetermined value; a plurality of power supply voltage generating circuits each of which generates a different DC voltage on a basis of an output voltage of the secondary coil of the transformer; and a power supply feedback circuit that supplies an error signal to the oscillation control circuit as a feedback signal by comparing a main power supply voltage from a main power supply voltage generating circuit of the plurality of power supply voltage generating circuits with a reference voltage and detecting a variation of the main power supply voltage as the error signal. In addition, an intermittent oscillation pulse output from a microcomputer is supplied to a connection point between a reference voltage line in the power supply feedback circuit and a control line of an error detecting element for detecting the error signal through a DC cutoff circuit.

In this structure, if the intermittent oscillation pulse output from the microcomputer is supplied to the connection point through the cutoff circuit in the standby state, the DC component of the intermittent oscillation pulse is removed through the cutoff circuit and is then supplied to the connection point. At this time, even when the voltage of the connection point becomes larger than the power supply voltage of the microcomputer, since the current does not flow backward from the connection point to the microcomputer, the microcomputer is normally operated. The microcomputer is normally operated, so that the intermittent oscillation pulse is effectively supplied to the connection point. Thereby, the error detecting element of the power supply feedback circuit is intermittently operated, so that the oscillation circuit is intermittently oscillated and thus the transformer is intermittently operated. As a result, the power consumption in the standby state is reduced.

According to this structure, even when the microcomputer is operated with the voltage lower than the main power supply voltage, the intermittent oscillation clock output from the microcomputer can be used in reducing the power consumption in the standby state. Thereby, it is possible to suppress the power consumption in the standby state to become equal to or smaller than 1 W with a structure requiring a low cost.

A third aspect of the invention provides a switching power supply device including: an oscillation circuit that generates an oscillation signal to switch a current flowing through a primary coil of a transformer; an oscillation control circuit that controls the oscillation signal of the oscillation circuit on a basis of a voltage induced to a secondary coil of the transformer such that a DC voltage becomes a predetermined value; a first power supply voltage generating circuit that generates a first DC power supply voltage by an output voltage of the secondary coil of the transformer; a second power supply voltage generating circuit that generates a second DC power supply voltage lower than the first DC power supply voltage by the output voltage of the secondary coil of the transformer; and a power supply feedback circuit that supplies an error signal to the oscillation control circuit as a feedback signal by comparing a reference voltage generated on a basis of the first DC power supply voltage with the second DC power supply voltage and detecting a variation of the second power supply voltage as the error signal. In addition, an intermittent oscillation pulse output from a microcomputer is supplied to a connection point between a reference voltage line in the power supply feedback circuit and a control line of an error detecting element for detecting the error signal through a DC cutoff circuit.

In this structure, if the intermittent oscillation pulse output from the microcomputer is supplied to the connection point through the DC cutoff circuit in the standby state, the DC component of the intermittent oscillation pulse is removed through the DC cutoff circuit and is then supplied to the connection point. At this time, even when the voltage of the connection point becomes larger than the power supply voltage of the microcomputer, since the current does not flow backward from the connection point to the microcomputer, the microcomputer is normally operated. The microcomputer is normally operated, so that the intermittent oscillation pulse is effectively supplied to the connection point. Thereby, the error detecting element of the power supply feedback circuit is intermittently operated, so that the oscillation circuit is intermittently oscillated and thus the transformer is intermittently operated. As a result, the power consumption in the standby state is reduced.

According to this structure, even when the microcomputer is operated with the voltage lower than the second power supply voltage, the intermittent oscillation clock output from the microcomputer can be used in reducing the power consumption in the standby state. Thereby, it is possible to suppress the power consumption in the standby state to become equal to or smaller than 1 W with a structure requiring a low cost.

According to the above-mentioned aspect, preferably, the DC cutoff circuit includes a series circuit including a capacitor and a resistor. Therefore, it is possible to supply the intermittent oscillation pulse output from the microcomputer to the connection point between the reference voltage line in the power supply feedback circuit and the control line of the error detecting element with a simple and small-priced circuit.

According to the above-mentioned aspect, preferably, a duty ratio and a frequency of the intermittent oscillation pulse are varied, and an intermittent oscillation pulse in a case in which the power consumption in a standby state is reduced at the maximum is set to the microcomputer. In addition, the set intermittent oscillation pulse is supplied to the connection point through the DC cutoff circuit in the standby state. Therefore, it is possible to reduce the power consumption in the standby state at the maximum.

According to the above aspect of the invention, the switching power supply device includes an oscillation circuit that generates an oscillation signal to switch a current flowing through a primary coil of a transformer; an oscillation control circuit that controls the oscillation signal of the oscillation circuit on a basis of a voltage induced to a secondary coil of the transformer such that a DC voltage becomes a predetermined value; a first power supply voltage generating circuit that generates a first DC power supply voltage by an output voltage of the secondary coil of the transformer; a second power supply voltage generating circuit that generates a second DC power supply voltage lower than the first DC power supply voltage by the output voltage of the secondary coil of the transformer; and a power supply feedback circuit that supplies an error signal to the oscillation control circuit as a feedback signal by comparing a reference voltage generated on a basis of the first DC power supply voltage with the second DC power supply voltage and detecting a variation of the second power supply voltage as the error signal. In addition, an intermittent oscillation pulse output from a microcomputer is supplied to a connection point between a reference voltage line in the power supply feedback circuit and a control line of an error detecting element for detecting the error signal through a series circuit including a capacitor and a resistor, a duty ratio and a frequency of the intermittent oscillation pulse are varied, and an intermittent oscillation pulse in a case in which the power consumption in a standby state is reduced at the maximum is set to the microcomputer, and the set intermittent oscillation pulse is supplied to the connection point through the series circuit including the capacitor and the resistor in the standby state. Therefore, even when the microcomputer is operated with the voltage lower than the second power supply voltage, the most suitable intermittent oscillation clock output from the microcomputer is supplied to the connection point, so that the power consumption in the standby state can be effectively reduced. Thereby, it is possible to suppress the power consumption in the standby state to become equal to or smaller than 1 W with a structure requiring a low cost.

Further, according to the aspect of the invention, the switching power supply device includes an oscillation circuit that generates an oscillation signal to switch a current flowing through a primary coil of a transformer; an oscillation control circuit that controls the oscillation signal of the oscillation circuit on a basis of a voltage induced to a secondary coil of the transformer such that a DC voltage becomes a predetermined value; a plurality of power supply voltage generating circuits each of which generates a different DC voltage on a basis of an output voltage of the secondary coil of the transformer; and a power supply feedback circuit that supplies an error signal to the oscillation control circuit as a feedback signal by comparing a main power supply voltage from a main power supply voltage generating circuit of the plurality of power supply voltage generating circuits with a reference voltage and detecting a variation of the main power supply voltage as the error signal. In addition, an intermittent oscillation pulse output from a microcomputer is supplied to a connection point between a reference voltage line in the power supply feedback circuit and a control line of an error detecting element for detecting the error signal through a DC cutoff circuit. Therefore, even when the microcomputer is operated with the voltage lower than the main power supply voltage, the intermittent oscillation clock output from the microcomputer can be used in reducing the power consumption in the standby state. Thereby, it is possible to suppress the power consumption in the standby state to become equal to or smaller than 1 W with a structure requiring a low cost.

According to the aspect of the invention, the switching power supply device includes an oscillation circuit that generates an oscillation signal to switch a current flowing through a primary coil of a transformer; an oscillation control circuit that controls the oscillation signal of the oscillation circuit on a basis of a voltage induced to a secondary coil of the transformer such that a DC voltage becomes a predetermined value; a first power supply voltage generating circuit that generates a first DC power supply voltage by an output voltage of the secondary coil of the transformer; a second power supply voltage generating circuit that generates a second DC power supply voltage lower than the first DC power supply voltage by the output voltage of the secondary coil of the transformer; and a power supply feedback circuit that supplies an error signal to the oscillation control circuit as a feedback signal by comparing a reference voltage generated on a basis of the first DC power supply voltage with the second DC power supply voltage and detecting a variation of the second power supply voltage as the error signal. In addition, an intermittent oscillation pulse output from a microcomputer is supplied to a connection point between a reference voltage line in the power supply feedback circuit and a control line of an error detecting element for detecting the error signal through a DC cutoff circuit. Therefore, even when the microcomputer is operated with the voltage lower than the second power supply voltage, the intermittent oscillation clock output from the microcomputer can be used in reducing the power consumption in the standby state. Thereby, it is possible to suppress the power consumption in the standby state to become equal to or smaller than 1 W with a structure requiring a low cost.

BRIEF DESCRIPTION OF THE DRAWINGS

FIG. 7 is a diagram illustrating an examination table for setting an intermittent oscillation pulse in a case in which the power consumption is reduced at the maximum by varying a duty ratio and a cycle (1/frequency) of an intermittent oscillation pulse for performing intermittent oscillation in a standby state in the embodiment.

DETAILED DESCRIPTION OF THE INVENTION

Figure 1:
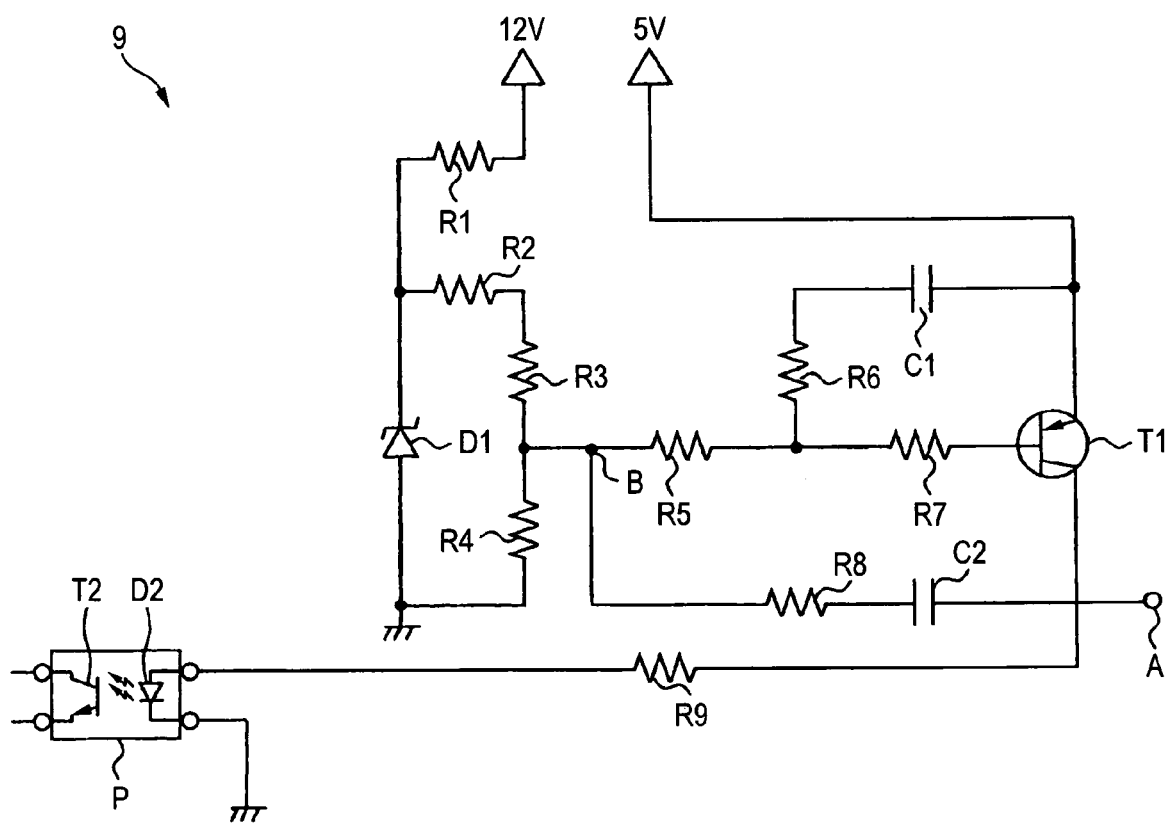
FIG. 1 is a circuit diagram of a power supply feedback circuit included in a switching power supply device according to a first embodiment of the invention.

Hereinafter, preferred embodiments of the invention will be described with reference to the accompanying drawings. FIG. 1 is a circuit diagram of a power supply feedback circuit included in a switching power supply device according to a first embodiment of the invention.

The power supply feedback circuit 9 includes resistors R1 to R9, capacitors C1 and C2, a transistor T1, a zener diode D1, and a photocoupler P. One end of the resistor R1 is supplied with a power supply voltage of 12 V, and the other end of the resistors R1 is connected to a cathode of the zener diode D1 and one end of the resistor R2. An anode of the zener diode D1 is connected to a ground, and the other end of the resistor R2 is connected to one end of the resistor R3. The other end of the resistor R3 is connected to one end of the resistor R4, one end of the resistor R5, and one end of the resistor R8.

The other end of the resistor R4 is connected to a ground, the other end of the resistor R5 is connected to one end of the resistor R6 and one end of the resistor R7, and the other end of the resistor R8 is connected to one end of the capacitor C2. The other end of the capacitor C2 is connected to an output port A of a microcomputer. The other end of the resistor R6 is connected to one end of the capacitor C1, and the other end of the resistor R7 is connected to a base of the transistor T1. The other end of the capacitor C1 is connected to an emitter of the transistor T1, and the emitter of the transistor T1 is supplied with a power supply voltage of 5 V. A collector of the transistor T1 is connected to an anode of a light-emitting diode D2 included in a photocoupler P through the resistor R9. A cathode of the light-emitting diode D2 is connected to a ground. A collector and an emitter of a phototransistor T2 included in the photocoupler P are connected to an oscillation control circuit, which will be described in detail below.

A voltage of a connection point B between a reference voltage line and a control line is set to have a predetermined voltage of 5 V by the operation of the resistors R1 to R4 and the zener diode D1. Here, the reference voltage line includes a connection point between the resistors R3 and R4, and a control line includes a base line of the transistor T1 that serves as an error detection element to detect an error signal generated when the power supply voltage of 5 V varies. The resistor R6 and the capacitor C1 serve to compensate for a phase at the time of operation of the transistor T1. A series circuit including the capacitor C2 and the resistor R8 is input with an intermittent oscillation pulse output from an output port A of the microcomputer operated with a power supply voltage of 3.3 V, and cuts off a DC component of the intermittent oscillation pulse to supply it to the connection point B.

Here, if the power supply voltage of 5 V, which is supplied to the emitter of the transistor T1, increases to exceed the voltage of 5 V, a collector current of the transistor T1 increases, and the increased collector current is input to the photocoupler P through the resistor R9. Thereby, in the light-emitting diode D2 of the photocoupler P, a current increases, so that an amount of emitted light increases. The phototransistor T2 receives the amount of emitted light, which has increased, and its equivalent resistance decreases. Accordingly, the oscillation control circuit, which will be described in detail below, controls the oscillation signal of the oscillation circuit, so that it controls the voltage having exceeded the power supply voltage of 5 V so as to return to 5 V.

In contrast, if the power supply voltage of 5 V increases to become smaller than the voltage of 5 V, the collector current of the transistor T1 decreases, and the decreased collector current is input to the photocoupler P through the resistor R9. Thereby, in the light-emitting diode D2 of the photocoupler P, the current decreases, so that the amount of emitted light decreases. The phototransistor T2 receives the amount of emitted light, which has decreased, and its equivalent resistance increases. Accordingly, the oscillation control circuit, which will be described in detail below, controls the oscillation signal of the oscillation circuit, so that it controls the voltage having become smaller than the power supply voltage of 5 V so as to return to 5 V. As such, the power supply feedback circuit 9 performs the feedback operation such that the power supply voltage of 5 V output from a 5-volt generating circuit, which will be described in detail below, is always maintained at the predetermined voltage of 5 V.

Figure 2:
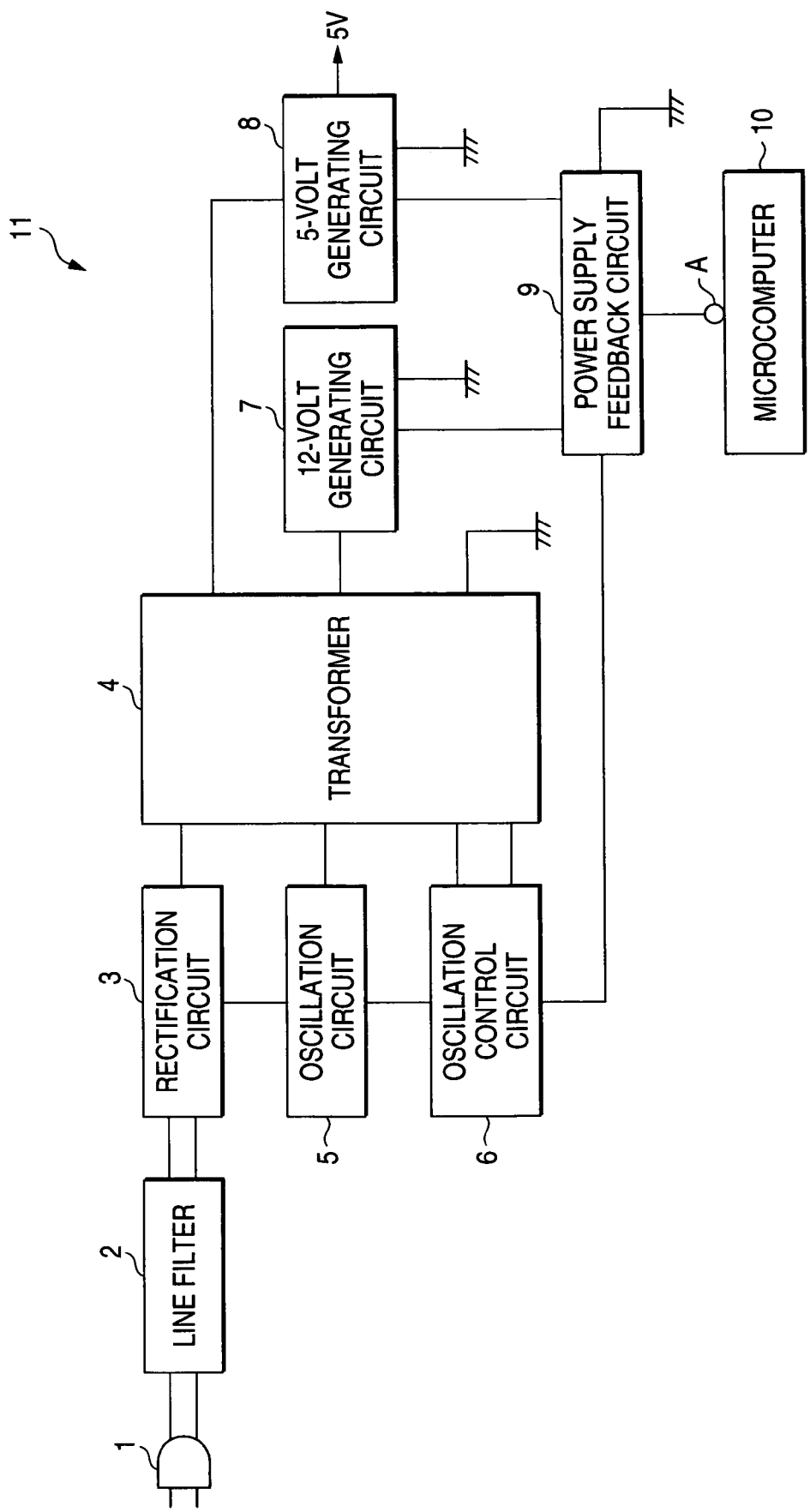
FIG. 2 is a block diagram illustrating a structure of the switching power supply device according to the first embodiment of the invention.

FIG. 2 is a block diagram illustrating a structure of the switching power supply device according to the first embodiment of the invention. This switching power supply device 11 includes an AC plug 1 that is inserted in an outlet of a commercial power supply, a line filter 2 that removes a noise of an AC line, a rectification circuit 3 that rectifies an AC voltage output from the line filter 2 to convert the rectified voltage into a DC voltage, a transformer 4 in which an induced voltage is output to a secondary coil through the switching operation of a primary coil, an oscillation circuit 5 that generates an oscillation signal to switch a current flowing through the primary coil of the transformer 4, and an oscillation control circuit 6 that controls the oscillation signal of the oscillation circuit 5 on a basis of a voltage induced to the secondary coil of the transformer 4 such that the DC voltage becomes a predetermined value.

The switching power supply device 11 further includes a 12-volt generating circuit 7 that serves as a first power supply voltage generating circuit to generate a first DC power supply voltage (for example, a power supply voltage of 12 V) by an output voltage of the secondary coil of the transformer 4, a 5-volt generating circuit 8 that serves as a second power supply voltage generating circuit to generate a second DC power supply voltage (for example, a power supply voltage of 5 V) smaller than the first DC power supply voltage by the output voltage of the secondary coil of the transformer 4, and a power supply feedback circuit 9 that supplies an error signal to the oscillation control circuit 6 as a feedback signal by comparing a reference voltage (a reference voltage of 5 V) generated on a basis of the power supply voltage of 5 V with the power supply voltage of 5 V and detecting a variation of the power supply voltage of 5 V as the error signal. Since the microcomputer 10 is provided in the optical disk device in advance, it is operated with a power supply voltage (for example, a power supply voltage of 3.3 V) smaller than the power supply voltage of 5 V (main power supply voltage) so as to control the overall device.

The switching power supply device 11 further includes, in addition to the 12-volt generating circuit 7 and the 5-volt generating circuit 8, a 3.3-volt generating circuit, a 2.5-volt generating circuit and a 10-volt generating circuit, which are not shown in the drawing. In particular, an output voltage of 3.3 V of the 3.3-volt generating circuit is supplied as a power supply voltage of the microcomputer 10.

Figure 3:
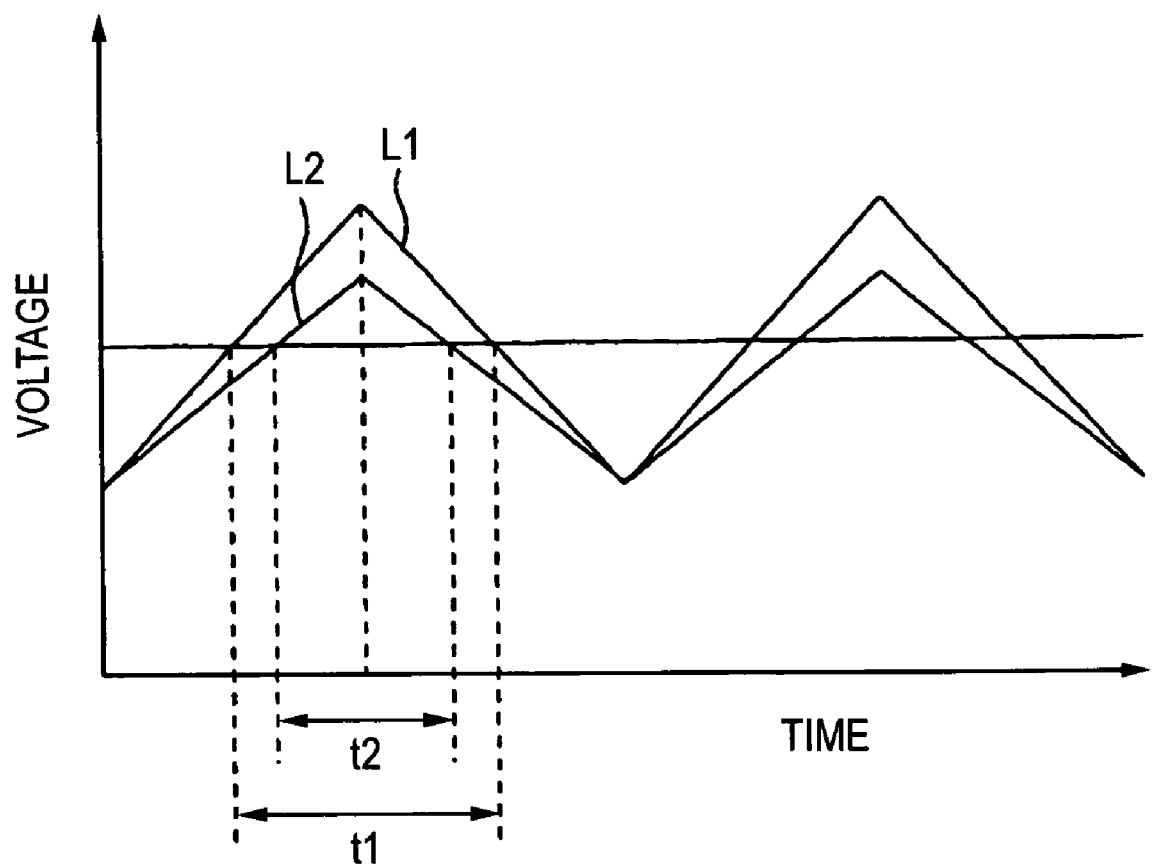
FIG. 3 is a diagram illustrating a waveform of an oscillation signal in the switching power supply device according to the first embodiment of the invention.

The oscillation circuit 5 outputs an oscillation signal of a triangular waveform shown in FIG. 3, and changes the inclination of the oscillation signal by the control signal output from the oscillation control circuit 6 that performs control through the output of the photocoupler P illustrated in FIG. 1. For example, if the power supply voltage of 5 V output from the 5-volt generating circuit 8 increases to exceed the voltage of 5V, an equivalent resistance of the phototransistor T2 of the photocoupler P is decreased by the operation described in FIG. 1 in the power supply feedback circuit 9, so that the oscillation control circuit 6 controls the inclination of the triangular waveform of the oscillation signal of the oscillation circuit 5.

For example, as shown in FIG. 3, in a case of the oscillation signal shown by the line L1, if the 5-volt generating circuit 8 outputs the voltage of 5 V. In this case, if the voltage output from the 5-volt generating circuit 8 exceeds the voltage of 5 V, the oscillation control circuit 6 controls the inclination of the triangular waveform of the oscillation signal of the oscillation circuit 5 such that it is decreased as shown by the line L2. Thereby, a period for which the switching transistor of the oscillation circuit 5 is turned on becomes shortened from a period t1 to a period t2, as shown in FIG. 3. As a result, the output current of the transformer 4 decreases, so that the output voltage of the 5-volt generating circuit 8 decreases to return to the original voltage of 5 V.

In contrast, if the voltage output from the 5-volt generating circuit 8, which outputs the voltage of 5 V, becomes smaller than the voltage of 5 V, the oscillation control circuit 6 controls the inclination of the triangular waveform of the oscillation signal of the oscillation circuit 5 such that it is increased. Thereby, a period for which the switching transistor of the oscillation circuit 5 is turned on becomes lengthened. As a result, the output current of the transistor 4 increases, so that the output voltage of the 5-volt generating circuit 8 increases to return to the original voltage of 5V.

In addition, the oscillation circuit 5 generates the oscillation signal of the triangular waveform, changes the inclination of the triangular waveform so as to vary a period for which the switching transistor is turned on, and maintains the output voltage of the 5-volt generating circuit 8 at a predetermined value. However, the operation of the oscillation circuit 5 is not limited thereto, but the oscillation circuit 5 may generate the oscillation signal through the pulse width modulation, may control the switching transistor by changing the pulse width such that the switching transistor is turned on or turned off, and may maintain the output voltage of the 5-volt generating circuit 8 as a predetermined value.

Figure 4:
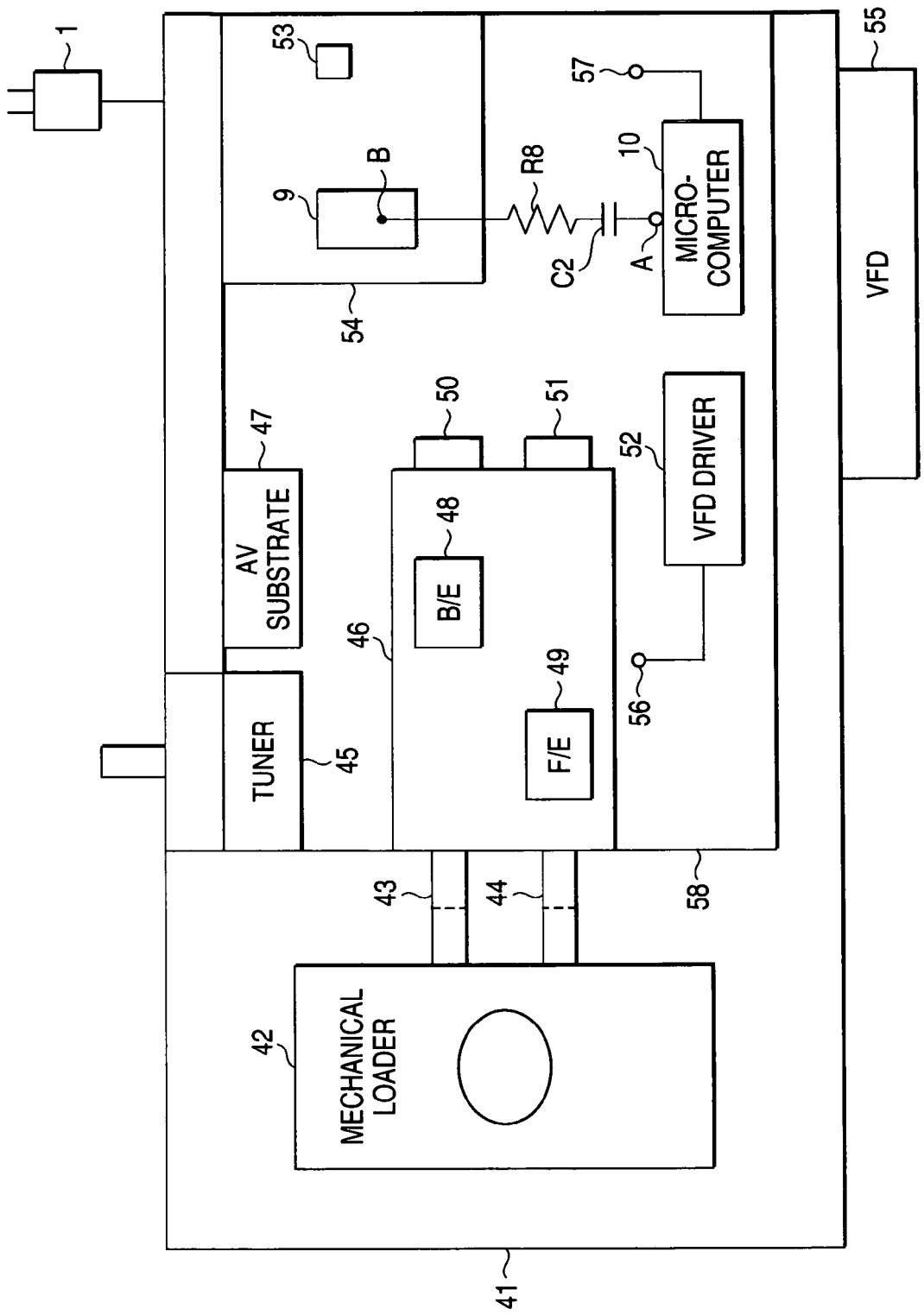
FIG. 4 is a diagram schematically illustrating an example of an arrangement of constituent elements of a DVD recorder on which the switching power supply device according to the first embodiment is mounted.

FIG. 4 is a diagram schematically illustrating an example of arrangement of constituent elements of a DVD recorder in which the switching power supply device 11 is mounted. In FIG. 4, reference numeral 41 indicates a housing in which the constituent elements of the DVD recorder are accommodated. The housing 41 includes a mechanical loader 42 that has an optical pickup unit, a spindle motor or the like, a tuner 45 that receives a television broadcasting signal, a main substrate 46 on which a back end (B/E) circuit chip 48 and a front end (F/E) circuit chip 49 are mounted, an AV substrate 47 on which an audio circuit and a video circuit are mounted, a power supply substrate 54 on which the constituent elements shown in FIG. 2 are mounted, a VFD (fluorescent display tube) driver substrate 52 on which a VFD driver circuit for driving the VFD 55 is mounted, a microcomputer 10 that controls the overall device, or the like.

The tuner 45, the main substrate 46, the AV substrate 47, the power supply substrate 54, the VFD driver substrate 52, the microcomputer 10 or the like are mounted on a substrate 58 attached to a chassis (not shown). An optical pickup unit (not shown) included in the mechanical loader 42 is connected to the main substrate 46 through a flexible flat cable (FFC) 43. In addition, a spindle motor (not shown) included in the mechanical loader 42 is connected to the main substrate 46 through an FFC 44.

The AV substrate 47 is connected to a connection terminal 50 of the main substrate 46 through an FFC (not shown). The power supply substrate 54 is connected to a connection terminal 51 of the main substrate 46 through an FFC (not shown). The power supply terminal 56 of the VFD driver substrate 52 is supplied with a voltage of 5 V output from a 5-volt power supply terminal 53 of the power supply substrate 54 through a circuit pattern (not shown). Since the microcomputer 10 is operated with the power supply voltage of 3.3 V, a power supply terminal 57 of the microcomputer 10 is supplied with a voltage of 3.3 V which is output from the 3.3-volt generating circuit (not shown) mounted on the power supply substrate 54.

In the present embodiment, an output port A of the microcomputer 10 is connected to a connection point B (which is the same as the connection point B of FIG. 1) of the power supply feedback circuit 9 through the capacitor C2 and the resistor R8. In FIG. 4, the capacitor C2 and the resistor R8 are shown to be disposed outside the power supply feedback circuit 9, but are actually disposed in the power supply feedback circuit 9.

In the meantime, in order that the switching power supply device 11 is mounted in the DVD recorder as shown in FIG. 4, and the power consumption is reduced at the time when the DVD recorder is in a standby state, an intermittent oscillation pulse output from the microcomputer 10 is input to the power supply feedback circuit 9. Hereinafter, a method of reducing the power consumption at the time when the DVD recorder is in the standby state will be described.

In order to reduce the power consumption at the time when the DVD recorder is in the standby state, the intermittent oscillation pulse output from the microcomputer 10 is directly supplied to the connection point B of the power supply feedback circuit 9, in the related art. However, in this case, the microcomputer 10 does not normally operate. This results from the fact that since the power supply voltage of the microcomputer 10 is 3.3 V and the voltage at the connection point B of the power supply feedback circuit 9 is 5 V, the current flows backward from the connection point B to the microcomputer 10.

Accordingly, in the present embodiment, it is constructed such that the intermittent oscillation pulse output from the microcomputer 10 is supplied to the connection point B through a series circuit including the capacitor C2 and the resistor R8, an intermittent oscillation pulse in a case in which the power consumption is reduced at the maximum at the time when the DVD recorder is in the standby state is set to the microcomputer 10 by changing a duty ratio and a frequency of the intermittent oscillation pulse, and the set intermittent oscillation pulse is supplied to the connection point B through the series circuit including the capacitor C2 and the resistor R8 in the standby state.

Figure 5:
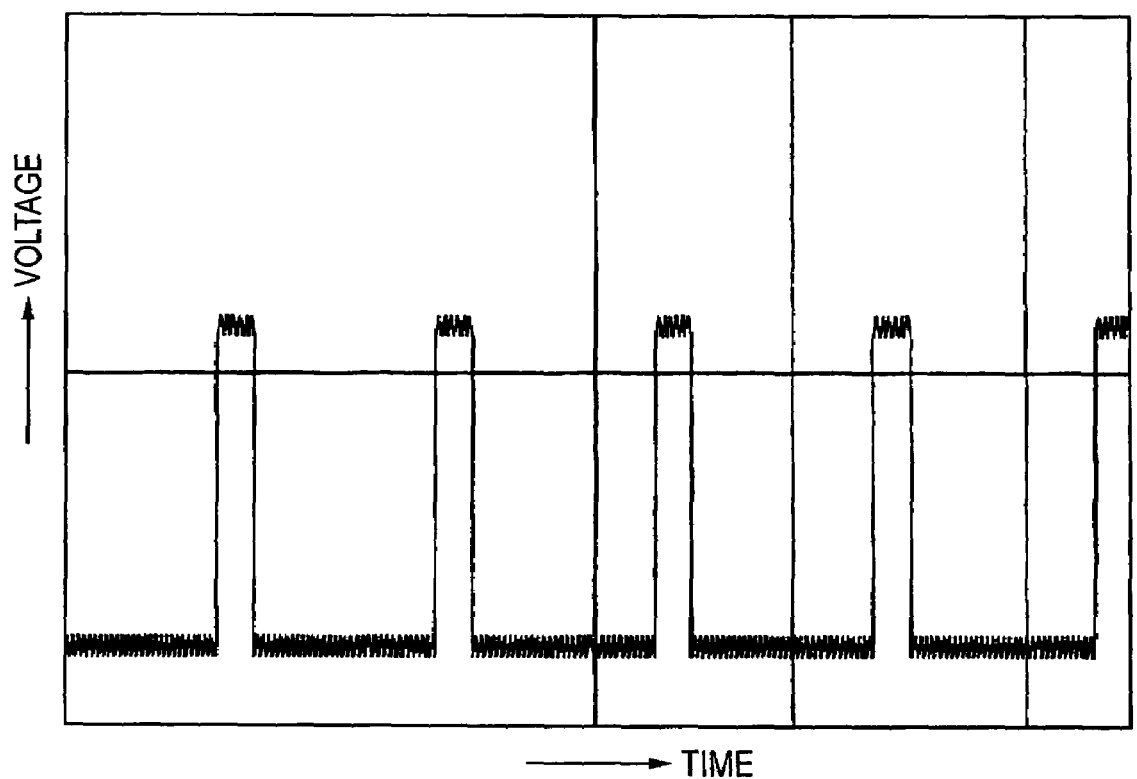
FIG. 5 is a diagram illustrating a signal waveform of an intermittent oscillation pulse output from an output port of a microcomputer in the embodiment.
Figure 6:
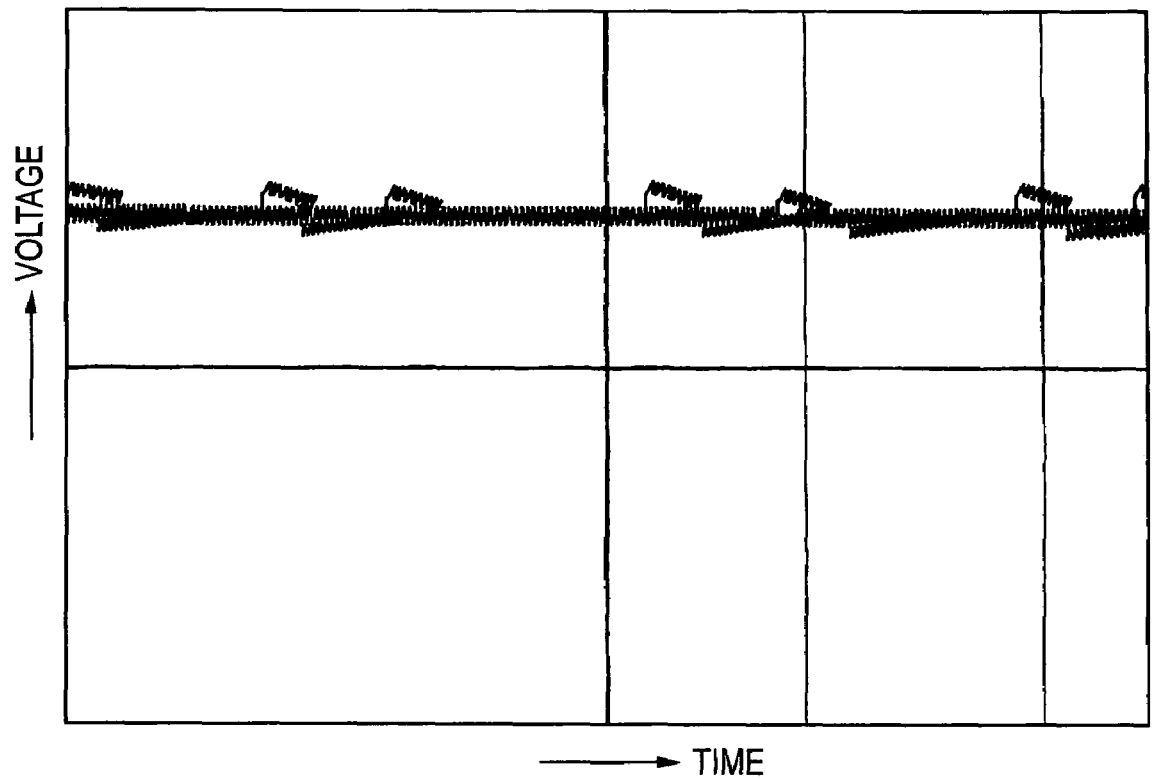
FIG. 6 is a diagram illustrating a signal waveform of an intermittent oscillation pulse of a connection point when the intermittent pulse shown in FIG. 5 supplied to the connection point of the power supply feedback circuit through a series circuit including a capacitor and a resistor.
Figure 8:
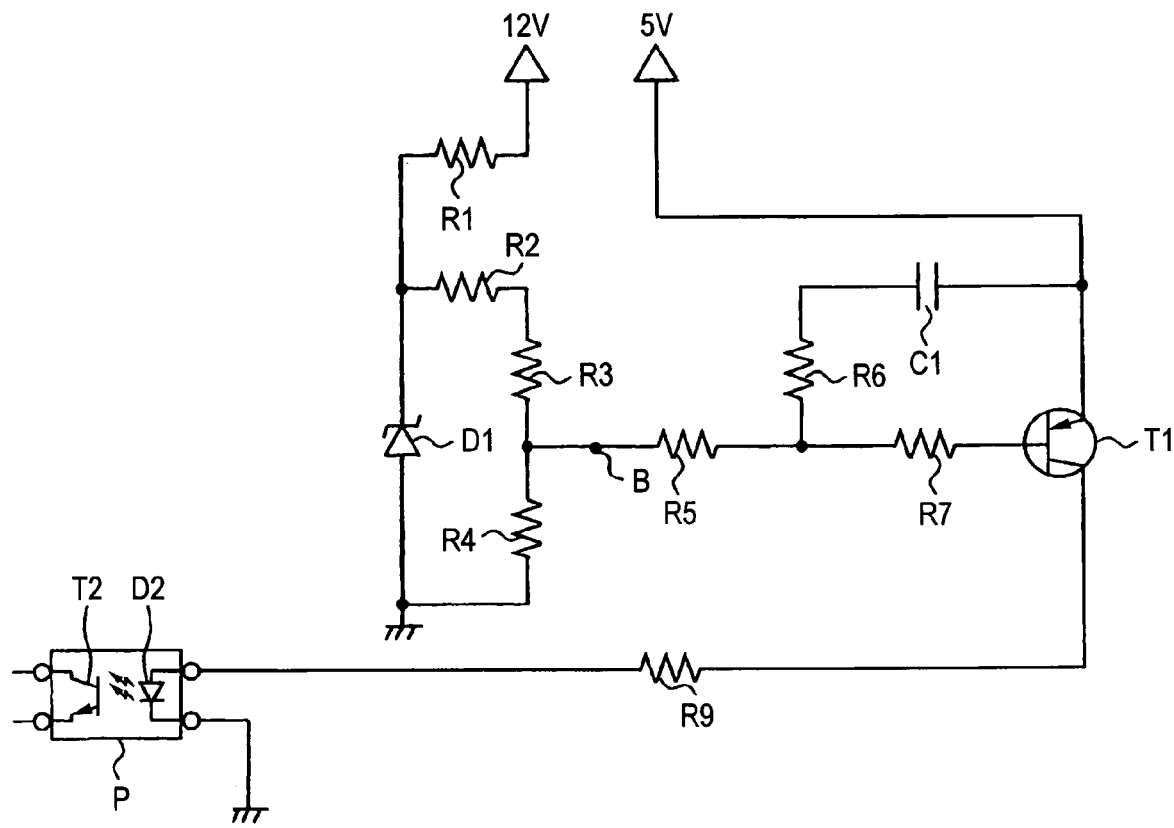
FIG. 8 is a circuit diagram of a power supply feedback circuit included in a switching power supply device according to a related art.

FIG. 5 shows an intermittent oscillation pulse a output from the output port A of the microcomputer 10 in the present embodiment, and FIG. 6 shows an intermittent oscillation pulse b of the connection point B when the intermittent pulse a is supplied to the connection point B of the power supply feedback circuit 9 through a series circuit including the capacitor C2 and the resistor R8. As shown in FIG. 5, if the intermittent oscillation pulse a of which an amplitude voltage is 3.3 V is supplied to the connection point B of the power supply feedback circuit 9 through the series circuit including the capacitor C2 and the resistor R8, a DC component is cut off and the DC component of the connection point B increases, which results in an intermittent oscillation pulse b shown in FIG. 6.

In addition, the transistor T1 performs switching operation by the intermittent oscillation pulse b, so that the current of a light-emitting diode D2 of the photocoupler P is decreased. As a result, the amount of emitted light of the light-emitting diode D2 is decreased, the equivalent resistance of the phototransistor T2 is increased, and the power consumption is reduced. That is, the transistor T1 of the power supply feedback circuit 9 intermittently operates, the oscillation circuit 5 intermittently oscillates, and the transformer 4 intermittently operates. As a result, the power consumption in the standby state is reduced.

FIG. 7 is a diagram illustrating an examination table for setting an intermittent oscillation pulse in a case in which the power consumption is reduced at the maximum by varying a cycle (1/frequency) and a duty ratio of an intermittent oscillation pulse for performing intermittent oscillation in a standby state in the present embodiment. In the examination table, a symbol O indicates a duty ratio and a cycle which can be selected by control of a remote controller. The duty ratio and the cycle, which can be selected with reference to this examination table, are selected by the remote controller, the intermittent oscillation pulse of the duty ratio and the cycle in a case in which the power consumption is reduced at the maximum in the standby state is set to the microcomputer 10, and the microcomputer 10 supplies the set intermittent oscillation pulse to the connection point B of the power supply feedback circuit 9 through the series circuit including the capacitor C2 and the resistor R8 in the standby state. As a result, through the above-mentioned operation, the DVD recorder can reduce the power consumed by the switching power supply device 11 in the standby state to achieve the low power consumption.

According to the above-mentioned embodiment, the series circuit including the capacitor C2 and the resistor R8 is inserted between the output port A of the microcomputer 10 and the connection point B, and the intermittent oscillation pulse output from the microcomputer 10 is supplied to the connection point B through the series circuit including the capacitor C2 and the resistor R8 in the standby state. As a result, the power consumption in the standby state becomes, for example, 0.8 W. In addition, if the duty ratio and the cycle (1/frequency) of the intermittent oscillation pulse output from the microcomputer 10 are changed in accordance with the examination table shown in FIG. 7, and the intermittent oscillation pulse in a case in which the power consumption is reduced at the maximum is supplied to the connection point B through the series circuit including the capacitor C2 and the resistor R8 in the standby state, the power consumption in the standby state is further decreased, which results in 0.65 W. The power consumption in the standby state becomes equal to or smaller than 1 W, so that a value of the power consumption in the standby state to be a target (equal to or smaller than 1 W) is cleared.

What is claimed is:

1. A switching power supply device comprising:
  an oscillation circuit that generates an oscillation signal to switch a current flowing through a primary coil of a transformer;
  an oscillation control circuit that controls the oscillation signal of the oscillation circuit on a basis of a voltage induced to a secondary coil of the transformer such that a DC voltage becomes a predetermined value;
  a first power supply voltage generating circuit that generates a first DC power supply voltage by an output voltage of the secondary coil of the transformer;
  a second power supply voltage generating circuit that generates a second DC power supply voltage lower than the first DC power supply voltage by the output voltage of the secondary coil of the transformer; and a power supply feedback circuit that detects a variation of the second power supply voltage as an error signal by comparing a reference voltage generated on a basis of the first DC power supply voltage with the second DC power supply voltage, and supplies the error signal to the oscillation control circuit as a feedback signal, wherein a duty ratio and a frequency of an intermittent oscillation pulse are varied to determine the duty ratio and the frequency of the intermittent oscillation pulse that provides a lowest power consumption in a standby state and a microcomputer is configured to output the intermittent oscillation pulse with the determined duty ratio and frequency, the intermittent oscillation pulse output from the microcomputer is supplied to a connection point between a reference voltage line in the power supply feedback circuit and a control line of an error detecting element through a series circuit including a capacitor and a resistor, and the intermittent oscillation pulse with the determined duty ratio and frequency output from the microcomputer is supplied to the connection point through the series circuit including the capacitor and the resistor in the standby state.

2. A switching power supply device comprising:

an oscillation circuit that generates an oscillation signal to switch a current flowing through a primary coil of a transformer;

an oscillation control circuit that controls the oscillation signal of the oscillation circuit on a basis of a voltage induced to a secondary coil of the transformer such that a DC voltage becomes a predetermined value;

a plurality of power supply voltage generating circuits each of which generates a different DC voltage on a basis of an output voltage of the secondary coil of the transformer; and a power supply feedback circuit that detects a variation of the main power supply voltage as an error signal by comparing a main power supply voltage output from a main power supply voltage generating circuit of the plurality of power supply voltage generating circuits with a reference voltage, and supplies the error signal to the oscillation control circuit as a feedback signal, wherein an intermittent oscillation pulse output from a microcomputer is supplied to a connection point between a reference voltage line in the power supply feedback circuit and a control line of an error detecting element through a DC cutoff circuit, a duty ratio and a frequency of the intermittent oscillation pulse are varied to determine the duty ratio and the frequency of the intermittent oscillation pulse that provides a lowest power consumption in a standby state and a microcomputer is configured to output the intermittent oscillation pulse with the determined duty ratio and frequency, and the intermittent oscillation pulse with the determined duty ratio and frequency output from the microcomputer is supplied to the connection point through the DC cutoff circuit in the standby state.

3. A switching power supply device comprising:

an oscillation circuit that generates an oscillation signal to switch a current flowing through a primary coil of a transformer;

an oscillation control circuit that controls the oscillation signal of the oscillation circuit on a basis of a voltage induced to a secondary coil of the transformer such that a DC voltage becomes a predetermined value;

a first power supply voltage generating circuit that generates a first DC power supply voltage by an output voltage of the secondary coil of the transformer;

a second power supply voltage generating circuit that generates a second DC power supply voltage lower than the first DC power supply voltage by the output voltage of the secondary coil of the transformer; and a power supply feedback circuit that detects a variation of the second power supply voltage as an error signal by comparing a reference voltage generated on a basis of the first DC power supply voltage with the second DC power supply voltage, and supplies the error signal to the oscillation control circuit as a feedback signal, wherein an intermittent oscillation pulse output from a microcomputer is supplied to a connection point between a reference voltage line in the power supply feedback circuit and a control line of an error detecting element through a DC cutoff circuit, a duty ratio and a frequency of the intermittent oscillation pulse are varied to determine the duty ratio and the frequency of the intermittent oscillation pulse that provides a lowest power consumption in a standby state and the microcomputer is configured to output the intermittent oscillation pulse with the determined duty ratio and frequency, and the intermittent oscillation pulse with the determined duty ratio and frequency output from the microcomputer is supplied to the connection point through the DC cutoff circuit in the standby state.

* * * * *